United States Patent
Frontini et al.

(10) Patent No.: US 12,538,393 B2
(45) Date of Patent: Jan. 27, 2026

(54) MICROWAVE OVEN AND ASSEMBLING METHOD THEREOF

(71) Applicant: WHIRLPOOL CORPORATION, Benton Harbor, MI (US)

(72) Inventors: Massimiliano Frontini, Casciago (IT); Marco Giuliani, Comerio (IT)

(73) Assignee: Whirlpool Corporation, Benton Harbor, MI (US)

(*) Notice: Subject to any disclaimer, the term of this patent is extended or adjusted under 35 U.S.C. 154(b) by 872 days.

(21) Appl. No.: 17/828,500

(22) Filed: May 31, 2022

(65) Prior Publication Data
US 2023/0010226 A1    Jan. 12, 2023

(30) Foreign Application Priority Data
Jun. 4, 2021   (EP) .................................. 21177852

(51) Int. Cl.
*H05B 6/74* (2006.01)
*H05B 6/70* (2006.01)
*H05B 6/76* (2006.01)

(52) U.S. Cl.
CPC ............ *H05B 6/745* (2013.01); *H05B 6/707* (2013.01); *H05B 6/76* (2013.01)

(58) Field of Classification Search
CPC .... E21B 17/042; E21B 19/161; E21B 19/165; G01V 3/28; H05B 6/6402; H05B 6/707; H05B 6/745; H05B 6/76

USPC ....... 219/753, 739, 745, 746, 747, 748, 750, 219/756

See application file for complete search history.

(56) References Cited

U.S. PATENT DOCUMENTS

| | | | | |
|---|---|---|---|---|
| 3,867,605 | A | * | 2/1975 | Yee ...................... H05B 6/6402 219/739 |
| 4,144,436 | A | * | 3/1979 | Hauck ...................... H05B 6/74 219/746 |
| 4,162,380 | A | | 7/1979 | Burke |
| 4,316,069 | A | | 2/1982 | Fitzmayer |
| 6,784,406 | B2 | | 8/2004 | Park |

FOREIGN PATENT DOCUMENTS

| | | |
|---|---|---|
| DE | 102016221083 A1 | 4/2018 |
| WO | 0158216 A1 | 8/2001 |

* cited by examiner

*Primary Examiner* — Quang T Van
(74) *Attorney, Agent, or Firm* — Price Heneveld LLP

(57) ABSTRACT

A microwave oven includes a muffle that includes a plurality of walls and defines an internal cavity for housing food, a radiofrequency supplying assembly that is configured to generate and propagate radiofrequency waves into the internal cavity via an access opening provided on one of the plurality of walls of the muffle, and a mounting flange arranged on an outer side of the muffle in correspondence to the access opening and configured to establish a coupling with the waveguide of the radiofrequency supplying assembly. The radiofrequency supplying assembly includes a radiofrequency generator, and a waveguide coupled to the radiofrequency generator and configured to guide the radiofrequency waves from the radiofrequency generator to the internal cavity.

17 Claims, 6 Drawing Sheets

MICROWAVE OVEN AND ASSEMBLING METHOD THEREOF

CROSS-REFERENCE TO RELATED APPLICATIONS

This application claims priority to European Patent Application No. 21177852.7, filed on Jun. 4, 2021, entitled "MICROWAVE OVEN AND ASSEMBLING METHOD THEREOF," the disclosure of which is hereby incorporated herein by reference in its entirety.

BACKGROUND OF THE DISCLOSURE

The invention relates to a microwave oven that may be used for heating or cooking or thawing food through a radiofrequency radiation.

SUMMARY OF THE DISCLOSURE

According to one aspect of the present disclosure, a microwave oven includes a muffle that includes a plurality of walls and defines an internal cavity for housing food, a radiofrequency supplying assembly that is configured to generate and propagate radiofrequency waves into the internal cavity via an access opening provided on one of the plurality of walls of the muffle, and a mounting flange arranged on an outer side of the muffle in correspondence to the access opening and configured to establish a coupling with the waveguide of the radiofrequency supplying assembly. The radiofrequency supplying assembly includes a radiofrequency generator, and a waveguide coupled to the radiofrequency generator and configured to guide the radiofrequency waves from the radiofrequency generator to the internal cavity.

According to another aspect of the present disclosure, a method for assembling a microwave oven includes the steps of providing a muffle having a plurality of walls and configured to define an internal cavity for housing food, providing a radiofrequency supplying assembly that includes a radiofrequency generator and at least one waveguide configured to guide radiofrequency waves from the radiofrequency generator into the internal cavity via an access opening provided on one of the plurality of walls, and coupling the radiofrequency supplying assembly to the muffle via a mounting flange arranged on an outer side of the muffle in correspondence to the access opening.

According to another aspect of the present disclosure, a method for assembling a microwave oven includes the steps of providing a muffle having a plurality of walls and configured to define an internal cavity for housing food, and coupling a radiofrequency supplying assembly to the muffle via a mounting flange arranged on an outer side of the muffle.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

Figure 1:
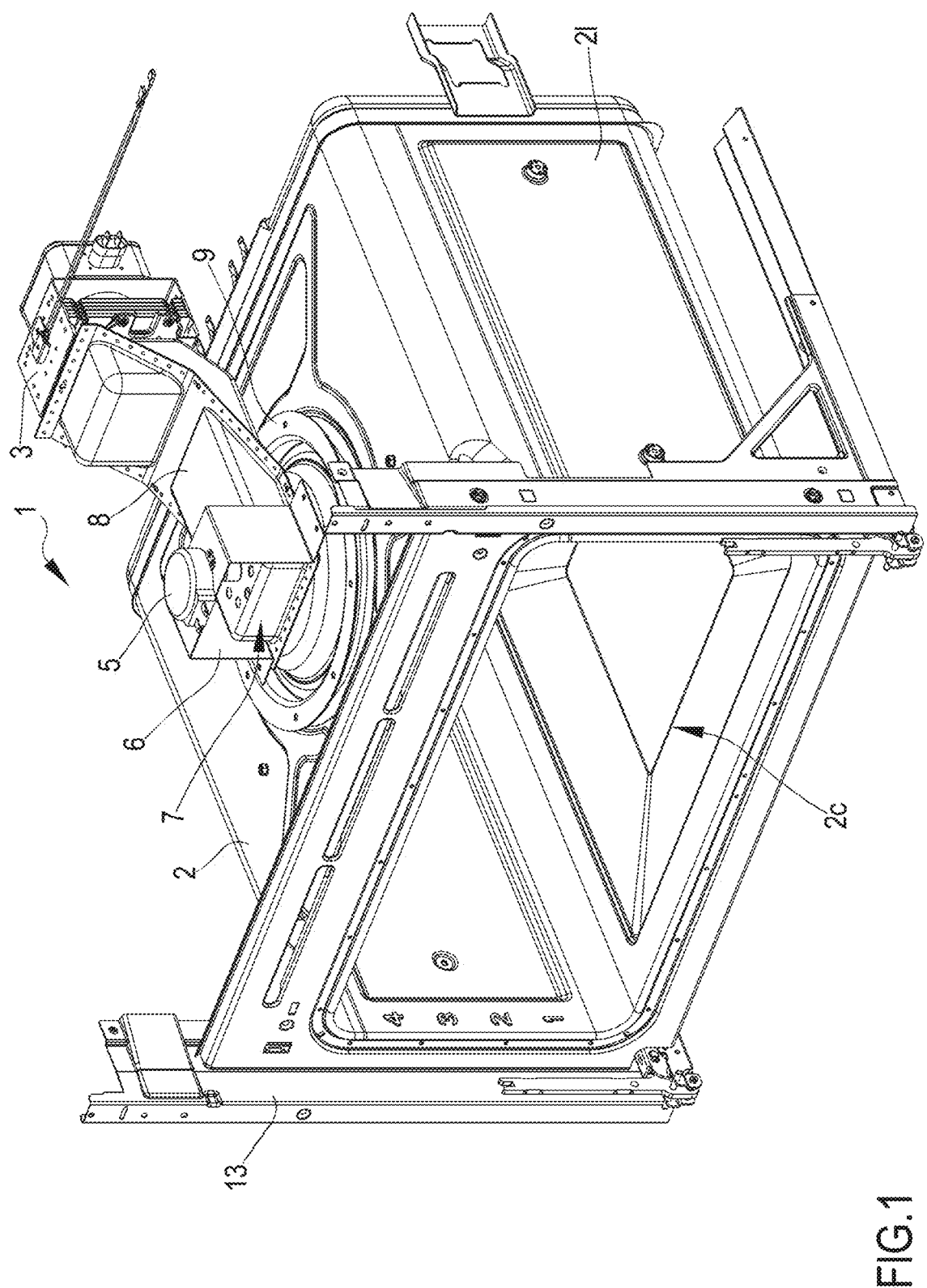
FIG. 1 is, in an assembled view, a microwave oven according to the invention.

In FIG. 1, the reference number 1 indicates a microwave oven. The microwave oven 1 comprises a muffle 2 which is provided with a plurality of walls 21, in particular a left wall, a right wall opposite and preferably parallel to the left wall, a bottom wall and a top wall. The bottom wall and the top wall are preferably parallel and opposite one another. A rear wall connects the left wall, the right wall, the bottom wall, preferably at an end portion thereof, and the top wall in order to define a cavity 2c apt to house, in use, food to be heated or cooked or thawed through a radiofrequency radiation.

The walls 21 of the muffle 2 may be metal, which may allow radiofrequency radiation to be contained within the muffle 2. In particular, the walls 21 of the muffle 2 may include a sheet of metal, and may be bent or welded together during the manufacturing process of the microwave oven 1.

The microwave oven 1 herein described may be configured to be a free-standing oven or a built-in microwave oven. Specifically, the embodiments shown in the annexed FIGS. 1-5 are for a built-in type microwave oven 1, which for this purpose is provided with a supporting frame 13 which is configured to support the muffle 2. The supporting frame 13 may be arranged at a front portion of the muffle 2 and may surround a front opening of the muffle 2.

The microwave oven 1 according to the present disclosure may be configured to be installed in a recessed or flush-type mounting. The supporting frame 13 may be configured to allow the microwave oven 1 to be installed in a recessed or flush-type mounting.

In some embodiments, the supporting frame 13 may be configured to support a front door of the microwave oven 1 (not shown). The front door is configured to close the internal cavity 2c of the muffle 2 at least for allowing the cooking or heating or thawing of the food.

The microwave oven 1 disclosed in the present application is further provided with a radiofrequency supplying assembly 3, 4, 5, 6, 7, 8, 9, which is configured to generate and propagate the radiofrequency waves into the internal cavity 2c.

In order to allow this propagation of radiofrequency waves, at least one of the walls 21 of the muffle 2 is provided with an access opening 14. In the embodiments shown in FIGS. 1-5, the access opening 14 is provided on the top wall of the microwave oven 1.

The radiofrequency supplying assembly 3, 4, 5, 6, 7, 8, 9 is provided with a radiofrequency generator 3 (in particular, a magnetron) and with a waveguide 8 coupled to the radiofrequency generator 3 and configured to guide the radiofrequency waves from the radiofrequency generator 3 to the internal cavity 2c. The waveguide 8 may be formed of metal, such as sheet metal, which may convey the radiofrequency from the radiofrequency generator 3 to the muffle 2. An outlet of the waveguide 8 is configured to direct the radiofrequency waves at least towards one predetermined direction and/or zone of radiation of the internal cavity 2c of the muffle 2.

In some embodiments, the radiofrequency generator 3 can include a rotatable stirrer, which includes a shaft and a blade 5h. The purpose of the rotatable stirrer is to allow a more even distribution of the radiofrequency in the internal cavity 2c of the muffle 2.

The radiofrequency supplying assembly 3, 4, 5, 6, 7, 8, 9 may further include a stirrer motor 5 which is connected to the rotatable stirrer. In some embodiments, the stirrer motor 5 is a stepped motor, and the connection with the rotatable stirrer is removable. A stirrer motor bracket 6 is part of the radiofrequency supplying assembly 3, 4, 5, 6, 7, 8, 9 and is provided for the purpose of fixing the stirrer motor 5 at a predetermined position lying at a predetermined distance from the waveguide 8.

The radiofrequency supplying assembly 3, 4, 5, 6, 7, 8, 9 may further comprise a mounting bracket 4 which is configured to connect the waveguide 8 to the radiofrequency generator 3. In an embodiment, the mounting bracket 4 is provided with a plurality, in particular four, through holes at substantially lateral end portions thereof. In the embodiment shown in FIG. 2, two through holes are arranged at the right end portion of the mounting bracket 4 and two through holes are arranged at the left end portion of the mounting bracket 4. The mounting bracket 4 assumes the form of a lamina that connects a front portion of the radiofrequency generator 3 with an end of the waveguide 8. The mounting bracket 4 may particularly connect the front portion of the radiofrequency generator 3 with the end of the waveguide 8 via one or more screws that pass through the through holes of the mounting bracket 4.

Figure 2:
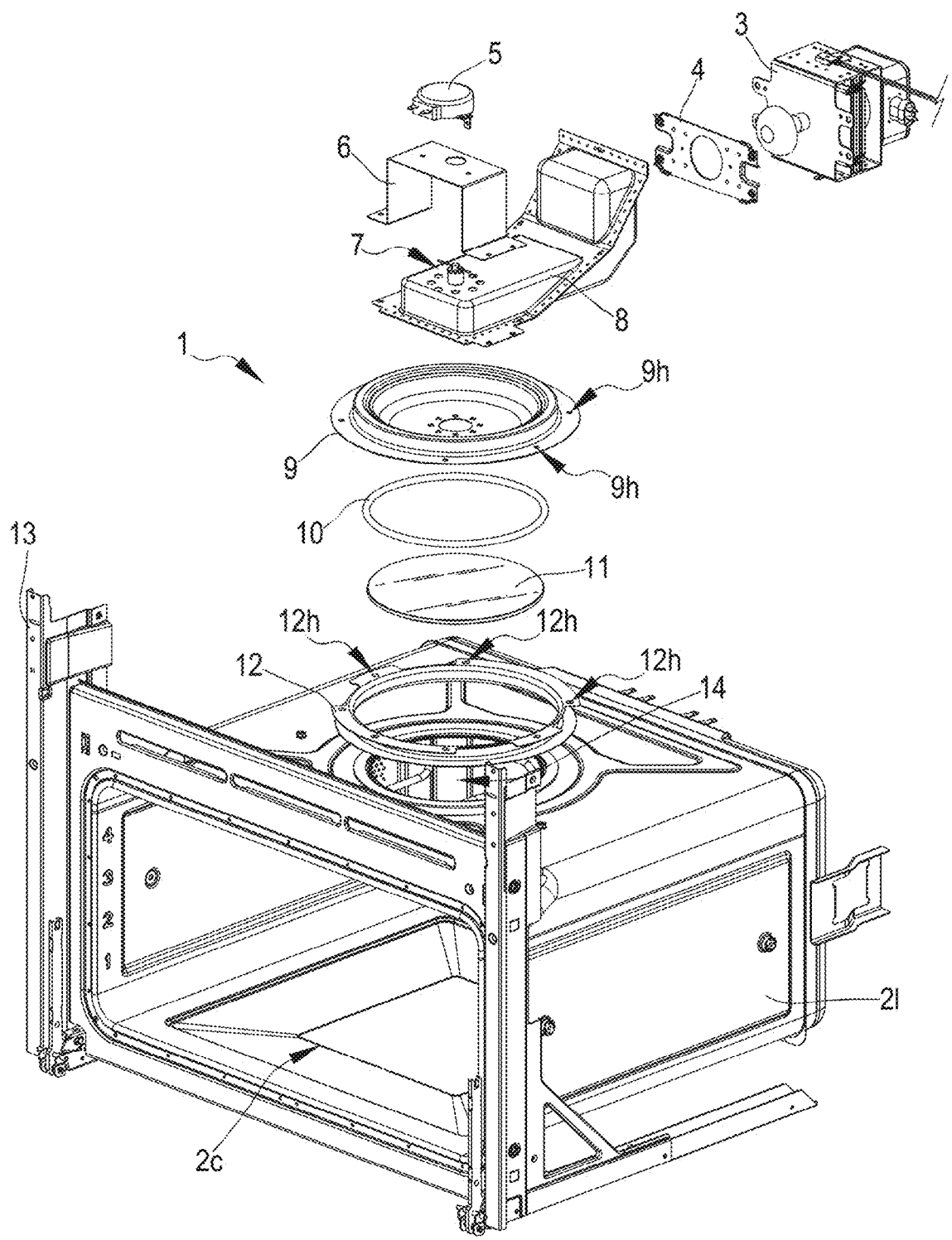
FIG. 2 is, in an exploded view, a microwave oven according to the invention.

As illustrated in FIG. 2, the microwave oven 1 is provided with a mounting flange 12 arranged on an outer side of the muffle 2 in correspondence to the access opening 14. The purpose of the mounting flange 12 is to establish a coupling with the radiofrequency supplying assembly 3, 4, 5, 6, 7, 8, 9. The mounting flange 12 may be a metal mounting flange 12. This ensures a sufficient robustness therefor, and prevents leakages or at least contains the leakages of radiofrequency outside the muffle 2. Various materials are contemplated.

Several embodiments of pre-assembling between the radiofrequency supplying assembly 3, 4, 5, 6, 7, 8, 9 and the muffle 2 have been conceived and are herein described.

In the embodiment illustrated in FIG. 2, the mounting flange 12 is disposed wholly on an outer side of the muffle 2. This allows for convenient assembling between the radiofrequency supplying assembly 3, 4, 5, 6, 7, 8, 9 and the muffle 2. In particular, the purpose of the mounting flange 12 is to allow the coupling between the radiofrequency supplying assembly 3, 4, 5, 6, 7, 8, 9 and the muffle 2 through fastening operations that take place wholly outside the internal cavity 2c. This simplifies the operations that are performed during the oven manufacturing process. In detail, the mounting flange 12 is configured and particularly conceived for allowing a connection with the waveguide 8.

As shown in FIGS. 2-5, the access opening 14 provided on the top wall of the muffle 2 is substantially round and the mounting flange 12 is shaped as a ring with a substantially round central hole that follows thus the shape of the access opening 14.

The inner diameter of the main hole of the mounting flange 12 is substantially equal to or even greater than the diameter of the access opening 14. Thus, the mounting flange 12 may surround the access opening 14.

The microwave oven 1 comprises fastening elements for fixing the radiofrequency supplying assembly 3, 4, 5, 6, 7, 8, 9 to the mounting flange 12. These fastening elements are configured to engage the mounting flange 12 while laying wholly outside of the walls 21 of the muffle 2. The fastening elements may include screws. A variety of types of fastening elements are contemplated.

As illustrated in FIG. 2, in an exemplary embodiments, the mounting flange 12 is provided with a plurality of holes 12h which are configured to engage the fastening elements. In some embodiments, the holes 12h are arranged substantially at an outer perimeter of the mounting flange 12. Further, in some embodiments, adjacent holes 12h are equidistantly distributed along the perimeter of the mounting flange 12. In various embodiments, the mounting flange 12 may be glued or welded on the outer side of the muffle 2.

The microwave oven 1 may include a protective shield 11 that is configured to prevent vapors and/or fumes generated in the internal cavity 2c of the muffle 2 from gaining access to the waveguide 8. The protective shield 11 may, additionally, not interfere with the passage of the radiofrequency waves from the waveguide 8 to the internal cavity 2c. The protective shield 11 may be made of glass. A variety of materials are contemplated.

In various embodiments, the protective shield 11 can be arranged to correspond with the mounting flange 12 and may be configured to occlude the access opening 14, which may aid in preventing vapors and/or fumes in the internal cavity 2c of the muffle 2 from gaining access to the waveguide 8.

As shown in FIGS. 2-5, the mounting flange 12 is provided with a seat for the protective shield 11. The seat is configured to retain the protective shield 11 in a use position and provide a supporting perimeter plane therefor, such that the protective shield 11 does not fall into the cavity 2c of the muffle 2.

Figure 4:
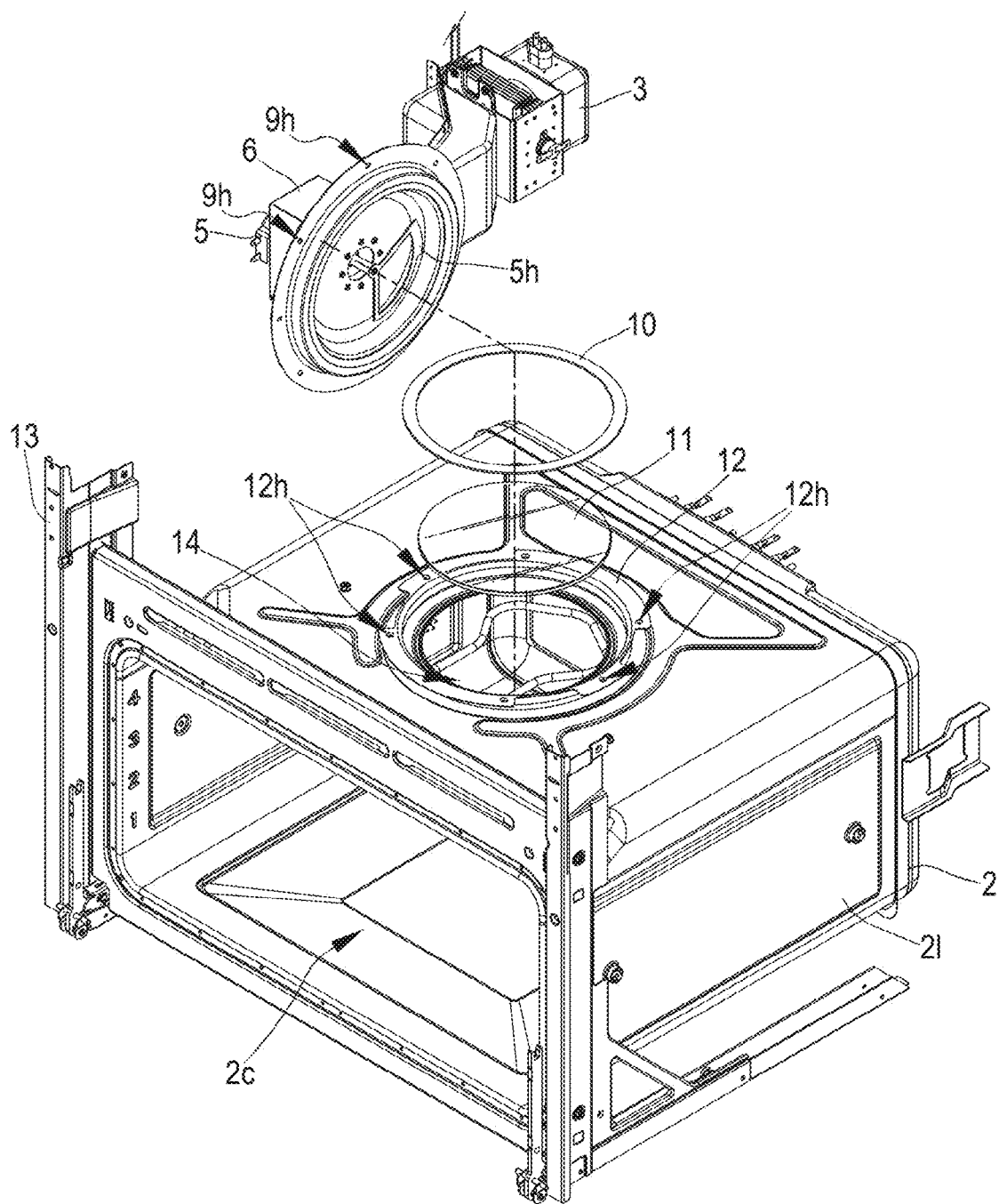
FIG. 4 is a microwave oven according to the invention, wherein the assembling between the muffle and the radiofrequency supplying assembly follows a second embodiment of the method according to the invention.

In the embodiment shown in FIG. 4, the protective shield 11 is sandwiched between the radiofrequency supplying assembly 3, 4, 5, 6, 7, 8, 9 and the muffle 2. In such an embodiment, the stability of the protective shield 11 and the consequent occlusion of the access opening 14 are advantageously ensured by the coupling of the waveguide 8 to the mounting flange 12. The waveguide 8 and the mounting flange 12 are coupled, such that undesired movements of the protective shield 11 in the axial direction are prevented.

Figure 3:
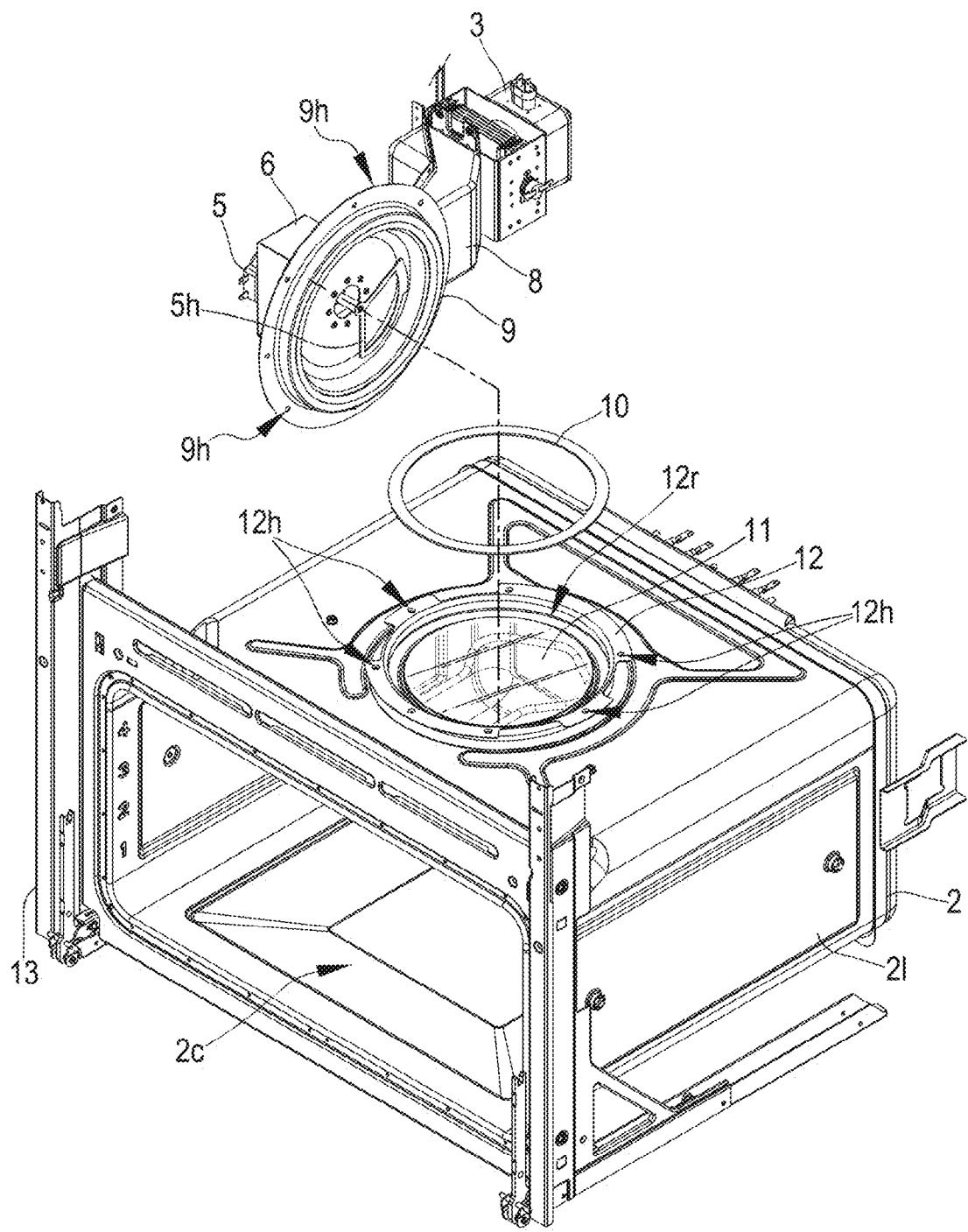
FIG. 3 is a microwave oven according to the invention, wherein the assembling between the muffle and the radiofrequency supplying assembly follows a first embodiment of the method according to the invention.

In the embodiment illustrated in FIG. 3, the protective shield 11 is coupled to the muffle 2. In particular, the protective shield 11 is coupled to the muffle 2 via the mounting flange 12. In this embodiment, the mounting flange 12 is fixed to the muffle 2 via glue. In the embodiment illustrated in FIG. 5, the protective shield 11 is coupled to the radiofrequency supplying assembly 3, 4, 5, 6, 7, 8, 9. In particular, the protective shield 11 is coupled to the waveguide 8 of the radiofrequency supplying assembly 3, 4, 5, 6, 7, 8, 9. The protective shield 11 may be glued to the radiofrequency supplying assembly 3, 4, 5, 6, 7, 8, 9, and/or the waveguide 8, in various implementations.

In some embodiments, the radiofrequency supplying assembly 3, 4, 5, 6, 7, 8, 9 is provided with a connecting portion 9 which is configured to be fixed at least partially in direct contact with the mounting flange 12 and/or to lie in substantial proximity of the mounting flange 12. The connecting portion 9 includes an aperture which is configured to allow a calibrated conveyance of the radiofrequency waves to the internal cavity 2*c*. The aperture may be a central, substantially circular aperture. The aperture of the connecting portion 9 may be substantially coaxial to the access opening 14 of the muffle 2, as illustrated in FIG. 2. The connecting portion 9 may be configured to be coupled with the mounting flange 12 to form a substantially rigidly connected assembly.

In some embodiments, the connecting portion 9 is substantially disc-shaped and is provided with a plurality of holes 9*h*. The plurality of holes 9*h* may be arranged at a peripheral portion of the connecting portion 9, such that the holes 9*h* are peripheral holes. The purpose of the holes 9*h* is to be selectively engaged with fastening elements. A variety of hole 9*h* arrangements on the connecting portion 9 are contemplated.

The outlet of the waveguide 8 may be axially aligned with the aperture of the connecting portion 9, such that interference by the connecting portion 9 with the radiation of the radiofrequency waves into the internal cavity 2*c* of the muffle 2 is minimized.

The connecting portion 9 may be provided with a substantially flanged connecting ring coupled with the mounting flange 12. In various embodiments, the flanged connecting ring and/or the entire connecting portion 9 is formed of metal. The peripheral holes 9*h* may be present on the substantially flanged connecting ring.

In some embodiments, in the fully assembled condition of the microwave oven 1, the connecting portion 9 is positioned at a substantial end of the waveguide 8 that is opposite to the end of the waveguide 8 that is coupled with the radiofrequency generator 3.

As illustrated in FIG. 3, in some embodiments, the connecting portion 9 is integrally coupled with the waveguide 8. In other words, the connecting portion 9 and the waveguide 8 are a single unitary body. As further illustrated in FIG. 3, the connecting portion 9 is connected to the stirrer motor bracket 6, and the stirrer blade 5*h* of the rotatable stirrer passes through the aperture of the connecting portion 9.

The microwave oven 1 may further include a radiofrequency sealing element 10. The radiofrequency sealing element 10 may be substantially sandwiched between the radiofrequency supplying assembly 3, 4, 5, 6, 7, 8, 9 and the mounting flange 12. The radiofrequency sealing element 10 is configured to prevent the radiofrequency leakages that may be present between the muffle 2 and the radiofrequency supplying assembly 3, 4, 5, 6, 7, 8, 9. The assembly formed by the mounting flange 12 and the connecting portion 9 encloses the radiofrequency sealing element 10. Various configurations for the radiofrequency sealing element 10 are contemplated. In an exemplary embodiment, the radiofrequency sealing element 10 comprises a metallic gasket.

In various implementations, the mounting flange 12 is configured to house and support the radiofrequency sealing element 10 at a predetermined position. For example, as illustrated in FIG. 2, the mounting flange 12 includes an annular recess 12*r* that is configured to house the radiofrequency sealing element 10. The recess 12*r* provides a resting plane for the radiofrequency sealing element 10. As shown in FIG. 2, the plurality of holes 9*h* of the connecting portion 9 are axially aligned with respective holes 12*h* of the flange 12. The holes 9*h* and 12*h* are through holes configured for allowing the passage of the screws.

Figure 6:
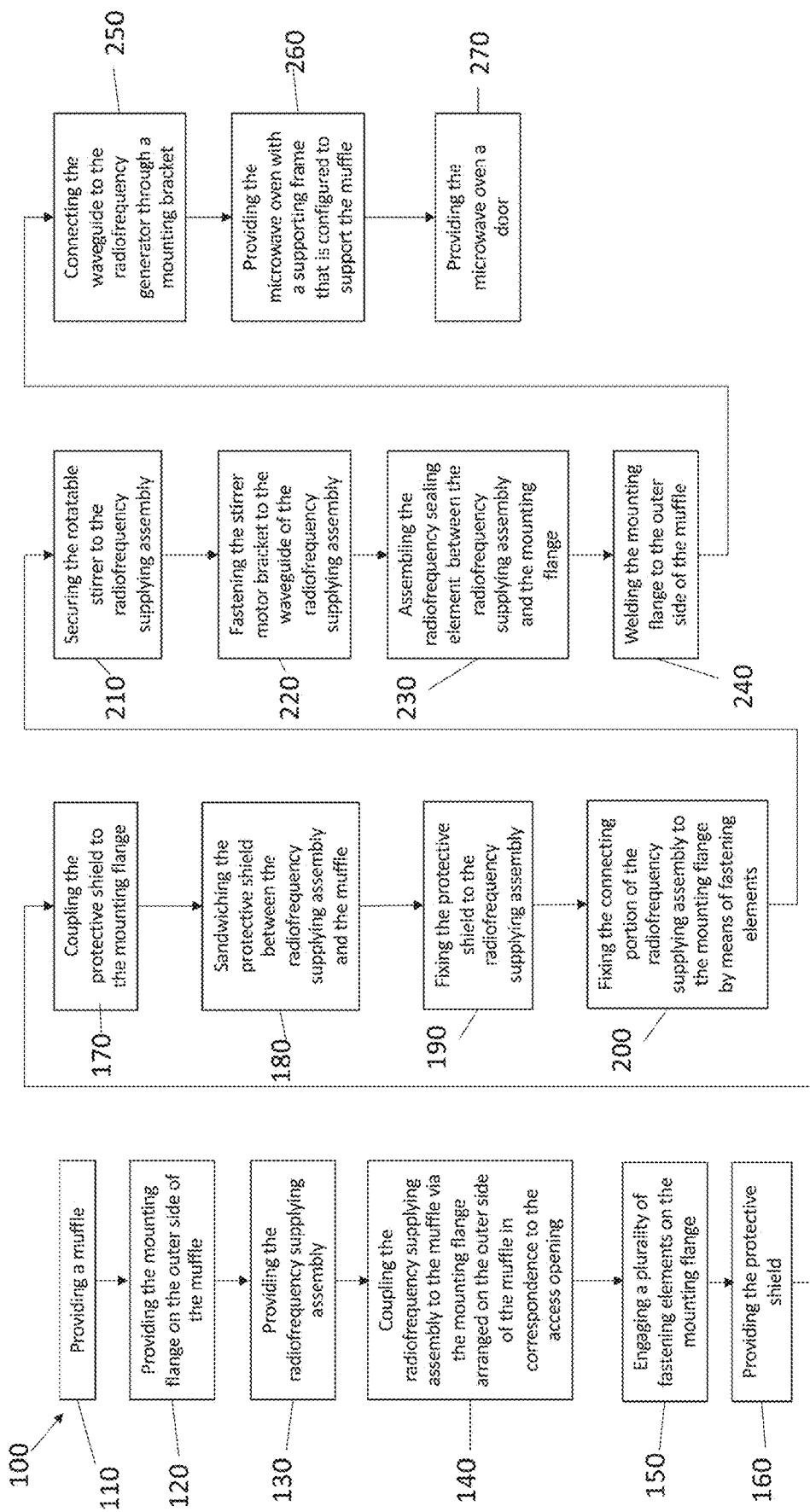
FIG. 6 is a flow chart illustrating a method of assembling a microwave oven according to an embodiment of the invention.

Referring now to FIG. 6, a method 100 for assembling the microwave oven 1 is shown. The method 100 includes the step 110 of providing a muffle 2. The muffle 2 may include the plurality of walls 21 and be configured to define an internal cavity 2*c* apt to house, in use, food to be heated or cooked or thawed through a radiofrequency radiation.

The method 100 may further include the step 120 of providing the mounting flange 12 on the outer side of the muffle 2.

The method 100 may further include the step 130 of providing the radiofrequency supplying assembly 3, 4, 5, 6, 7, 8, 9. The radiofrequency supplying assembly 3, 4, 5, 6, 7, 8, 9 may be configured to generate and propagate radiofrequency waves into the internal cavity 2*c*. The access opening 14 may be provided on one of the walls 21 and configured to allow the radiofrequency waves to gain access to the internal cavity 2*c*.

The method 100 may further include the step 140 of coupling the radiofrequency supplying assembly 3, 4, 5, 6, 7, 8, 9 to the muffle 2 via the mounting flange 12 arranged on the outer side of the muffle 2 in correspondence to the access opening 14. The step of coupling the radiofrequency supplying assembly 3, 4, 5, 6, 7, 8, 9 to the muffle 2 is performed through a mounting flange 12 arranged on an outer side of the muffle 2 in correspondence to the access opening 14.

The method 100 may further include one or more steps (e.g., steps 150, 170, 200, 210, 220, 230, 240, 250) of performing fastening operations. In various embodiments, the one or more steps of performing fastening operations may be performed wholly outside of the internal cavity 2*c*.

For example, the method 100 may include the step 150 of engaging a plurality of fastening elements on the mounting flange 12, wherein the fastening elements are configured for fixing the radiofrequency supplying assembly 3, 4, 5, 6, 7, 8, 9 to the mounting flange 12, in such a way that the fastening elements, once engaging the mounting flange 12, lie wholly outside the walls 21. The fastening elements may comprise screws, in some embodiments. Thus, the method 100 may include the step 150 of fixing the radiofrequency supplying assembly 3, 4, 5, 6, 7, 8, 9 to the mounting flange 12 with screws by engaging the screws in a plurality of respective holes 12*h* on the mounting flange 12. In particular, the coupling takes place by engaging the screws in a plurality of respective holes 12*h* on the mounting flange 12 in such a way that the screws are aligned along respective axes that are substantially parallel to each other.

The method 100 may further include the step 160 of providing the protective shield 11. The provided protective shield 11 may be configured to prevent vapors and/or fumes generated in the internal cavity 2*c* of the muffle 2 from gaining access to the waveguide 8 without substantially interfering with the passage of the radiofrequency waves from the waveguide 8 to the internal cavity 2*c*. The protective shield 11 provides for an occlusion of the access opening 14 through the protective shield 11 itself. In some embodiments, the protective shield 11 is a glass shield 11, which allows for a translucent or transparent occlusion of the access opening 14.

The method 100 may further include the step 170 of coupling the protective shield 11 to the mounting flange 12. In some embodiments, the step 170 includes accommodating the protective shield 11 in a seat defined by the mounting flange 12. The step 170 may include accommodating the protective shield 11 on the supporting perimeter plane. Step 170 may be performed after the mounting flange 12 has been fixed to the muffle 2 in step 120. For example, the step 170 may occur after the mounting flange 12 has been fixed to the top wall of the muffle 2. In some embodiments, the step 170 may include gluing the protective shield 11 to the mounting flange 12. The step 170 may produce an intermediately assembled product, as depicted in FIG. 3.

The method 100 may further include the step 180 of sandwiching the protective shield 11 between the radiofrequency supplying assembly 3, 4, 5, 6, 7, 8, 9 and the muffle 2. In various embodiments, step 180 includes sandwiching the protective shield 11 between the waveguide 8 and the mounting flange 12, as shown in FIG. 4.

Figure 5:
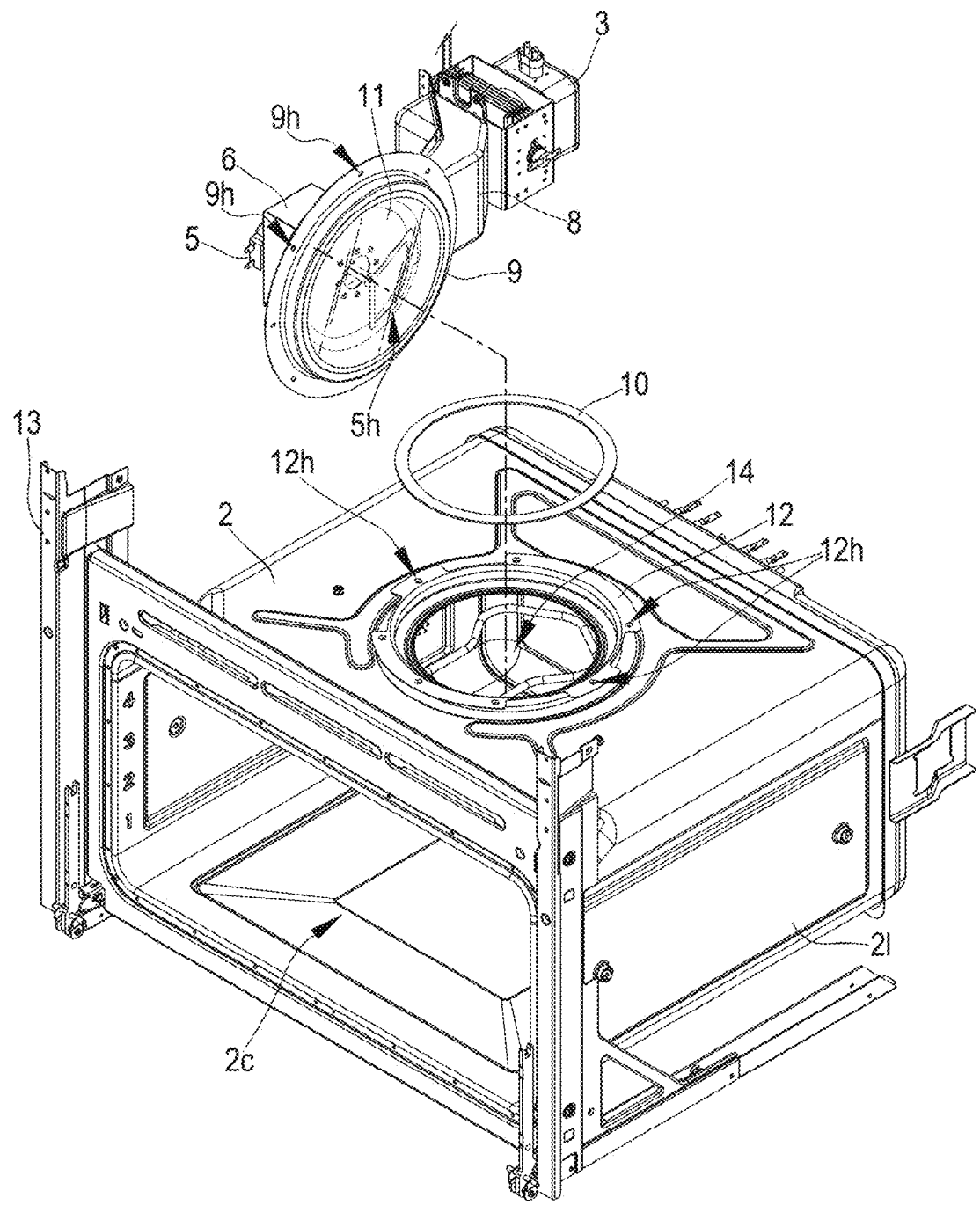
FIG. 5 is a microwave oven according to the invention, wherein the assembling between the muffle and the radiofrequency supplying assembly follows a third embodiment of the method according to the invention.

The method 100 may further include the step 190 of fixing the protective shield 11 to the radiofrequency supplying assembly 3, 4, 5, 6, 7, 8, 9. In various embodiments, the step 190 includes fixing the protective shield 11 to the waveguide 8. The step 190 may produce an intermediately assembled product, as depicted in FIG. 5. The step 190 of fixing the protective shield 11 to the radiofrequency supplying assembly 3, 4, 5, 6, 7, 8, 9 may include gluing the protective shield 11 to the radiofrequency supplying assembly 3, 4, 5, 6, 7, 8, 9. Doing so may result in the rotatable stirrer being firmly encapsulated between the connecting portion 9 and the protective shield 11, such that damage to the rotatable stirrer could be avoided during further manipulation of the radiofrequency supplying assembly 3, 4, 5, 6, 7, 8, 9 in the assembling process.

The method 100 may include the step 200 of fixing the connecting portion 9 of the radiofrequency supplying assembly 3, 4, 5, 6, 7, 8, 9 to the mounting flange 12 by means of fastening elements. The step 200 may include introducing the fastening elements (e.g., screws) into the plurality of holes 9h of the connecting portion 9 and the plurality of holes 12h of the mounting flange 12. The step 200 may include arranging the connecting portion 9 and the mounting flange 12 on two respective planes that are substantially parallel to each other.

The method 100 may further include the step 210 of securing the rotatable stirrer, configured to allow a substantially uniform distribution of the radiofrequency waves in the internal cavity 2c, to the radiofrequency supplying assembly 3, 4, 5, 6, 7, 8, 9. The step 210 may be performed before the protective shield 11 is firmly secured to the connecting portion 9 in step 190, especially in the case wherein the protective shield 11 is glued to the connecting portion 9. The connection between the rotatable stirrer and the stirrer motor 5 is realized by connecting the stirrer shaft, in particular an end of the stirrer shaft, to the stirrer motor 5. The method 100 may further include the step 220 of fastening the stirrer motor bracket 6 to the waveguide 8 of the radiofrequency supplying assembly 3, 4, 5, 6, 7, 8, 9. The method 100 may conveniently allow the rotatable stirrer to lie outside the internal cavity 2c in the fully assembled condition of the microwave oven 1.

Referring still to FIG. 6, the method 100 may include the step 230 of assembling the radiofrequency sealing element 10 between the radiofrequency supplying assembly 3, 4, 5, 6, 7, 8, 9 and the mounting flange 12. In various embodiments, the step 230 includes sandwiching the radiofrequency sealing element 10 between the radiofrequency supplying assembly 3, 4, 5, 6, 7, 8, 9 and the mounting flange 12, such that the radiofrequency sealing element 10 is substantially enclosed between the connecting portion 9 of the waveguide 8 and the mounting flange 12.

In the embodiment illustrated in FIG. 3, the method 100 may include the step 240 of welding the mounting flange 12 to the muffle 2, in particular on the outer side of the muffle 2.

The method 100 may include the step 250 of connecting the waveguide 8 to the radiofrequency generator 3 through a mounting bracket 4.

The method 100 may further include the step 260 of providing the microwave oven 1 with a supporting frame 13 that is configured to support the muffle 2. In particular, the method 100 may include the step 260 of assembling the supporting frame 13 on the front portion of the muffle 2 to provide a rigid connection between the supporting frame 13 and the walls 21 of the muffle 2.

In some embodiments, the method 100 may further include the step 270 of providing the microwave oven 1 a door and/or assembling the door to the walls 21 of the muffle 2 and/or directly to the supporting frame 13.

In some embodiments, the supporting frame 13 may comprise lateral L-shaped rails to assist the installation of the microwave oven 1 in a compartment. These L-shaped rails may be conveniently present when the supporting frame 13 is conceived for a flush-type installation.

The microwave oven 1 of the present disclosure has a variety of advantages. For example, the microwave oven 1 of the present disclosure is relatively simple to assemble. In particular, coupling the waveguide 8 to the muffle 2 not requiring access to the internal cavity 2c of the muffle 2 is advantageous. Moreover, improved sealing properties at the interface between the waveguide 8 and the muffle 2 ensures a better effectiveness in the prevention of losses of radiofrequency waves. It is herewith noted that the invention is not limited to the embodiments shown in the drawings.

Modifications or additions that are within the general knowledge of a person skilled in the art may be made to the microwave oven and to its assembly method herein described, without departing from the scope of protection provided by the claims.

According to one aspect of the present disclosure, a microwave oven includes a muffle that includes a plurality of walls and defines an internal cavity for housing food, a radiofrequency supplying assembly that is configured to generate and propagate radiofrequency waves into the internal cavity via an access opening provided on one of the plurality of walls of the muffle, and a mounting flange arranged on an outer side of the muffle in correspondence to the access opening and configured to establish a coupling with the waveguide of the radiofrequency supplying assembly. The radiofrequency supplying assembly includes a radiofrequency generator, and a waveguide coupled to the radiofrequency generator and configured to guide the radiofrequency waves from the radiofrequency generator to the internal cavity.

According to another aspect, the mounting flange is configured to allow the radiofrequency supplying assembly to be coupled to the muffle through fastening operations performed wholly outside the internal cavity.

According to another aspect, the mounting flange is welded to the muffle.

According to another aspect, a protective shield is configured to prevent at least one of vapors and fumes generated in the internal cavity from gaining access to the waveguide without substantially interfering with the passage of the radiofrequency waves from the waveguide to the internal cavity. The protective shield is at least one of fixed to the muffle via the mounting flange, sandwiched between the waveguide and the mounting flange, and fixed to the waveguide.

According to another aspect, the radiofrequency supplying assembly includes a connecting portion configured to be at least one of proximate to the mounting flange and fixed at least partially in direct contact with the mounting flange. Further, the connecting portion is at least one of coupled to the waveguide and integral with the waveguide.

According to another aspect, the mounting flange and the connecting portion are provided with a plurality of respective holes. The holes of the connecting portion are axially aligned with the holes of the mounting flange. Further, fastening elements are engaged in the holes for fixing the radiofrequency supplying assembly to the muffle.

According to another aspect, a radiofrequency sealing element is substantially sandwiched between the radiofrequency supplying assembly and the mounting flange. The radiofrequency sealing element is configured to prevent radiofrequency leakages between the muffle and the radiofrequency supplying assembly.

According to another aspect, the radiofrequency supplying assembly includes a rotatable stirrer configured to allow a substantially uniform distribution of the radiofrequency waves in the internal cavity and having a stirrer blade, a stirrer motor, and a stirrer shaft that connects the stirrer blade and the stirrer motor. Further, the radiofrequency supplying assembly includes a stirrer motor bracket configured to support the stirrer motor and being connected to at least one of the connecting portion and the waveguide.

According to another aspect of the present disclosure, a method for assembling a microwave oven includes the steps of providing a muffle having a plurality of walls and configured to define an internal cavity for housing food, providing a radiofrequency supplying assembly that includes a radiofrequency generator and at least one waveguide configured to guide radiofrequency waves from the radiofrequency generator into the internal cavity via an access opening provided on one of the plurality of walls, and coupling the radiofrequency supplying assembly to the muffle via a mounting flange arranged on an outer side of the muffle in correspondence to the access opening.

According to another aspect, the step of coupling the radiofrequency supplying assembly to the muffle includes performing fastening operations wholly outside the internal cavity.

According to another aspect, the step of providing a protective shield that prevents at least one of vapors and fumes generated in the internal cavity from gaining access to the waveguide without substantially interfering with the passage of the radiofrequency waves from the waveguide to the internal cavity is provided.

According to another aspect, the step of fixing the protective shield to the muffle via the mounting flange is provided.

According to another aspect, the step of sandwiching the protective shield between the waveguide and the mounting flange is provided.

According to another aspect, the step of fixing the protective shield to the waveguide is provided.

According to another aspect, the step of sandwiching a radiofrequency sealing element between the radiofrequency supplying assembly and the mounting flange, such that the radiofrequency sealing element is substantially enclosed between a connecting portion of the waveguide and the mounting flange, is provided.

According to another aspect of the present disclosure, a method for assembling a microwave oven includes the steps of providing a muffle having a plurality of walls and configured to define an internal cavity for housing food, and coupling a radiofrequency supplying assembly to the muffle via a mounting flange arranged on an outer side of the muffle.

According to another aspect, the step of coupling the radiofrequency supplying assembly to the muffle includes performing fastening operations wholly outside the internal cavity.

According to another aspect, the step of providing a protective shield that prevents at least one of vapors and fumes generated in the internal cavity from gaining access to a waveguide of the radiofrequency supplying assembly without substantially interfering with the passage of the radiofrequency waves from the waveguide to the internal cavity is provided.

According to another aspect, the step of fixing the protective shield to the muffle via the mounting flange is provided.

According to another aspect, the step of sandwiching the protective shield between the waveguide and the mounting flange is provided.

What is claimed is:

1. A microwave oven, comprising:
   a muffle that includes a plurality of walls and defines an internal cavity for housing food;
   a radiofrequency supplying assembly that is configured to generate and propagate radiofrequency waves into the internal cavity via an access opening provided on one of the plurality of walls of the muffle, the radiofrequency supplying assembly comprising:
      a radiofrequency generator; and
      a waveguide coupled to the radiofrequency generator and configured to guide the radiofrequency waves from the radiofrequency generator to the internal cavity;
   a mounting flange arranged on an outer side of the muffle in correspondence to the access opening and configured to establish a coupling with the waveguide of the radiofrequency supplying assembly; and
   a protective shield that is configured to prevent at least one of vapors and fumes generated in the internal cavity from gaining access to the waveguide without substantial interfering with the passage of the radiofrequency waves from the waveguide to the internal cavity, wherein the protective shield is at least one of:
      fixed to the muffle via the mounting flange;
      sandwiched between the wave guide and the mounting flange; and
      fixed to the waveguide.

2. The microwave oven of claim 1, wherein the mounting flange is configured to allow the radiofrequency supplying assembly to be coupled to the muffle through fastening operations performed wholly outside the internal cavity.

3. The microwave oven of claim 1, wherein the mounting flange is welded to the muffle.

4. The microwave oven of claim 1, wherein the radiofrequency supplying assembly comprises:
   a connecting portion configured to be at least one of proximate to the mounting flange and fixed at least partially in direct contact with the mounting flange, and wherein the connecting portion is at least one of coupled to the waveguide and integral with the waveguide.

5. The microwave oven of claim 4, wherein the mounting flange and the connecting portion are provided with a plurality of respective holes, the holes of the connecting portion being axially aligned with the holes of the mounting flange, and wherein fastening elements are engaged in the holes for fixing the radiofrequency supplying assembly to the muffle.

6. The microwave oven of claim 4, wherein the radiofrequency supplying assembly comprises:
- a rotatable stirrer configured to allow a substantially uniform distribution of the radiofrequency waves in the internal cavity and having a stirrer blade, a stirrer motor, and a stirrer shaft that connects the stirrer blade and the stirrer motor; and
- a stirrer motor bracket, configured to support the stirrer motor and being connected to at least one of the connecting portion and the waveguide.

7. The microwave oven of claim 1, further comprising:
- a radiofrequency sealing element substantially sandwiched between the radiofrequency supplying assembly and the mounting flange, the radiofrequency sealing element being configured to prevent radiofrequency leakages between the muffle and the radiofrequency supplying assembly.

8. A method for assembling a microwave oven, comprising the steps of:
- providing a muffle having a plurality of walls and configured to define an internal cavity for housing food;
- providing a radiofrequency supplying assembly that includes a radiofrequency generator and at least one waveguide configured to guide radiofrequency waves from the radiofrequency generator into the internal cavity via an access opening provided on one of the plurality of walls; and
- coupling the radiofrequency supplying assembly to the muffle via a mounting flange arranged on an outer side of the muffle in correspondence to the access opening; and
- providing a protective shield that prevents at least one of vapors and fumes generated in the internal cavity from gaining access to the waveguide without substantially interfering with the passage of the radiofrequency waves from the waveguide to the internal cavity.

9. The method of claim 8, wherein the step of coupling the radiofrequency supplying assembly to the muffle comprises:
- performing fastening operations wholly outside the internal cavity.

10. The method of claim 8, further comprising the step of:
- fixing the protective shield to the muffle via the mounting flange.

11. The method of claim 8, further comprising the step of:
- sandwiching the protective shield between the waveguide and the mounting flange.

12. The method of claim 8, further comprising the step of:
- fixing the protective shield to the waveguide.

13. The method of claim 8, further comprising the step of:
- sandwiching a radiofrequency sealing element between the radiofrequency supplying assembly and the mounting flange, such that the radiofrequency sealing element is substantially enclosed between a connecting portion of the waveguide and the mounting flange.

14. A method for assembling a microwave oven, comprising the steps of:
- providing a muffle having a plurality of walls and configured to define an internal cavity for housing food;
- coupling a radiofrequency supplying assembly to the muffle via a mounting flange arranged on an outer side of the muffle; and
- providing a protective shield that prevents at least one of vapors and fumes generated in the internal cavity from gaining access to a waveguide of the radiofrequency supplying assembly without substantially interfering with the passage of radiofrequency waves from the waveguide to the internal cavity.

15. The method of claim 14, wherein the step of coupling the radiofrequency supplying assembly to the muffle comprises:
- performing fastening operations wholly outside the internal cavity.

16. The method of claim 14, further comprising the step of:
- fixing the protective shield to the muffle via the mounting flange.

17. The method of claim 14, further comprising the step of:
- sandwiching the protective shield between the waveguide and the mounting flange.

* * * * *